(12) United States Patent
Datta et al.

(10) Patent No.: US 12,238,212 B2
(45) Date of Patent: Feb. 25, 2025

(54) DECENTRALIZED MULTI-AUTHORITY ATTRIBUTE-BASED ENCRYPTION

(71) Applicant: NTT Research, Inc., Sunnyvale, CA (US)

(72) Inventors: Pratish Datta, Sunnyvale, CA (US); Ilan Komargodski, Tel Aviv (IL); Brent Waters, Austin, TX (US)

(73) Assignee: NTT Research, Inc., Sunnyvale, CA (US)

( * ) Notice: Subject to any disclaimer, the term of this patent is extended or adjusted under 35 U.S.C. 154(b) by 224 days.

(21) Appl. No.: 18/030,436

(22) PCT Filed: Oct. 4, 2021

(86) PCT No.: PCT/US2021/053415
§ 371 (c)(1),
(2) Date: Apr. 5, 2023

(87) PCT Pub. No.: WO2022/076327
PCT Pub. Date: Apr. 14, 2022

(65) Prior Publication Data
US 2023/0379153 A1    Nov. 23, 2023

Related U.S. Application Data

(60) Provisional application No. 63/087,866, filed on Oct. 5, 2020.

(51) Int. Cl.
*H04L 29/06* (2006.01)
*G06F 21/00* (2013.01)
*H04L 9/08* (2006.01)
*H04L 9/30* (2006.01)
*H04L 9/32* (2006.01)

(52) U.S. Cl.
CPC ......... *H04L 9/3093* (2013.01); *H04L 9/0869* (2013.01); *H04L 9/3236* (2013.01)

(58) Field of Classification Search
CPC .... H04L 9/3093; H04L 9/0869; H04L 9/3236
See application file for complete search history.

(56) References Cited

U.S. PATENT DOCUMENTS

2010/0185861 A1*  7/2010  Chase ............... H04L 9/083
                                                   713/171
2018/0357933 A1* 12/2018  Takashima ........ H04L 9/0618
2019/0089687 A1*  3/2019  Fiske .................. H04L 9/304

OTHER PUBLICATIONS

International Search Authority reports and documents from PCT/US21/53415; 32 pgs.

(Continued)

*Primary Examiner* — Lisa C Lewis
(74) *Attorney, Agent, or Firm* — CipherLaw

(57) ABSTRACT

The invention relates to systems, methods, network devices, and machine-readable media for encrypting and decrypting messages in a decentralized multi-authority attribute-based encryption (MA-ABE) scheme for a non-trivial class of access policies whose security is based in the random oracle model solely on the Learning With Errors (LWE) assumption. In some embodiments, any party can become an authority and there is no requirement for any global coordination other than the creation of an initial set of common reference parameters.

20 Claims, 4 Drawing Sheets

(56) References Cited

OTHER PUBLICATIONS

Pratish Datta et al: "Decentralized Multi-Authority ABE for DNFs from LWE", IACR, International Association for Cryptologic Research; vol. 20201110:125210 Nov. 5, 2020 (Nov. 5, 2020), pp. 1-95, XP061041650, Retrieved from the Internet: URL: http://eprint.iacr.org/2020/1386.pdf.

Pratish Datta et al: "Decentralized Multi-Authority ABE for NC^1 from Computational-BDH", IACR, International Association for Cryptologic Research Sep. 30, 2021 (Sep. 30, 2021), pp. 1-25, XP061068887, Retrieved from the Internet: URL: https://eprint.iacr.org/2021/1325.pdf.

Kuchta Veronika et al: "Multi-authority Distributed Attribute-Based Encryption with Application to Searchable Encryption on Lattices", Jul. 14, 2017 (Jul. 14, 2017), SAT 2015 18th International Conference, Austin, TX, USA, Sep. 24-27, 2015; [Lecture Notes in Computer Science; Lect. Notes Computer], Springer, Berlin, Heidelberg, p. (S) 409-435, XP047420430, ISBN: 978-3-540-74549-5.

\* cited by examiner

DECENTRALIZED MULTI-AUTHORITY ATTRIBUTE-BASED ENCRYPTION

CROSS-REFERENCE TO RELATED APPLICATIONS

This application is a national stage application, filed under 35 U.S.C. § 371, of International Patent Application No. PCT/US2021/053415, filed Oct. 4, 2021, which claims the benefit of U.S. Provisional Application No. 63/087,866 filed Oct. 5, 2020, the contents of both of which are hereby incorporated in their entireties.

FIELD OF THE INVENTION

The present disclosure relates to decentralized multi-authority attribute-based encryption (MA-ABE) schemes for a non-trivial class of access policies whose security is based (in the random oracle model) solely on the Learning With Errors (LWE) assumption.

BACKGROUND OF THE INVENTION

Attribute-based encryption (ABE) is a generalization of traditional public-key encryption that offers fine-grained access control over encrypted data based on the credentials (or attributes) of the recipients. ABE comes in two avatars: ciphertext-policy and key-policy. In a ciphertext-policy ABE (CP-ABE), as the name suggests, ciphertexts are associated with access policies and keys are associated with attributes. In a key-policy ABE (KP-ABE), the roles of the attribute sets and the access policies are swapped, i.e., ciphertexts are associated with attributes and keys are associated with access policies. In both cases, decryption is possible only when the attributes satisfy the access policy.

Since its inception by Sahai and Waters and Goyal et al., ABE has become a fundamental cryptographic primitive with a long list of potential applications, Therefore, naturally designing ABE schemes has received tremendous attention by the cryptographic community resulting in a long sequence of works achieving various trade-offs between expressiveness, efficiency, security, and underlying assumptions.

Most of the works base their security on cryptographic assumptions related to bilinear maps. It is very natural to seek for constructions based on other assumptions. First, this is important from a conceptual perspective as not only more constructions increase our confidence in the existence of a scheme, but constructions using different assumptions often require new techniques which in turn improves our understanding of the primitive. Second, this is important in light of the known attacks on group-based constructions by quantum computers. Within this general goal, we currently have a handful of ABE schemes (that go beyond Identity-Based Encryption) which avoid bilinear maps as their underlying building blocks.

All of these works derive their security from the hardness of the learning with errors (LWE) problem, which is currently also believed to be hard against quantum computers. However, one striking fact is that existing LWE-based ABE schemes are designed in the key-policy setting. To date, the natural dual problem of constructing CP-ABE schemes based on the LWE assumption is essentially completely open.

The only known way to realize an LWE based CP-ABE scheme is to convert a circuit-based KP-ABE scheme into a CP-ABE scheme by using a universal circuit to represent an access policy as an attribute and an attribute set as a circuit. However, this transformation will inherently result with a CP-ABE for a restricted class of access policies and with parameters that are far from ideal. Concretely, for any polynomials s, d in the security parameter, it allows to construct a CP-ABE for access policies with circuits of size s and depth d. Moreover, the size of a ciphertext generated with respect to some access policy f will be $|f| \cdot \text{poly}(\lambda, s, d)$ (no matter what KP-ABE we start off with). That is, even if an f being encrypted has a very small circuit, the CP-ABE ciphertext would scale with the worst-case bounds s, d.

Thus, there is a need to improve upon the universal-circuit based CP-ABE construction described above while assuming only LWE to create a truly decentralized MA-ABE for some non-trivial class of access policies assuming hardness of LWE (and in the random oracle model).

BRIEF SUMMARY OF THE INVENTION

Some embodiments of the invention include systems, methods, network devices, and machine-readable media for encrypting a message according to a multi-authority attribute-based encryption scheme, including: storing an electronic message m comprising $m_i$ bits for encryption in a computerized storage media; executing a global setup algorithm to generate global parameters by: selecting LWE parameters and a noise distribution; generating a matrix B with a first column of data y of random elements and the remainder set as all 0s except the diagonal which is set to be 1; executing an authority setup algorithm to generate a public and secret key pair, by: generating a first LWE matrix A; generating a second LWE matrix H; setting the public key of the authority to be (A, H) and the secret key to be $T_A$; executing a key generation algorithm, by: computing a random identifier vector t for a user by applying a cryptographic hash function on a unique identifier; computing a vector k such that k*A=(1, t)*H; outputting vector k as the secret key; executing an encryption algorithm for the message m, by: for each bit $m_i$ of message m: generating a matrix X and a vector s and a matrix V whose first column is s; generating an LWE sample $c_i$ with LWE matrix A and secret X; generating an LWE sample $c_{i'}$ with LWE matrix H and secret X and adding M*V*B; computing $m_{i'}$ as most significant bit of s*y; computing ($c_i,c_{i'}$) and $m_i$ XOR $m_{i'}$; and storing an encrypted message in a computerized storage media, the encrypted message comprising, for each bit $m_i$, ($c_i,c_{i'}$) and $m_i^* = m_i$ XOR $m_{i'}$.

Other embodiments of the invention include systems, methods, network devices, and machine-readable media for decrypting a message according to a multi-authority attribute-based encryption scheme, including: storing a message in a computerized storage media comprising bits representing $c_1 \ldots c_n$ and $c_{1'}, \ldots c_{n'}$ and $m_{1*}, \ldots m_{n*}$, the message having been encrypted according to an attribute-based encryption scheme; computing a random identifier vector t for a user by applying a cryptographic hash function on a unique identifier; retrieving a secret key k from the computerized storage media; executing a decryption algorithm, wherein: to decrypt the $i^{th}$ bit of the message: computing a linear combination of $c_i^*k+c_{i'}(1,t)$; computing the most significant bit of the result XOR $m_{i*}$; and storing the decrypted message in the computerized storage media.

Further embodiments include distributing the secret key over a communications network by only one authority. In further embodiments each user is identified by a set of attributes and a decryption ability for each encrypted message is based on a function of the attributes. Further embodiments include distributing the secret key k over a communications network by any polynomial number of independent authorities. Further embodiments include selecting, for each independent authority, a predetermined number and a set of attributes whereby the user can only decrypt the message m if the user has at least the predetermined number of attributes from each authority.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
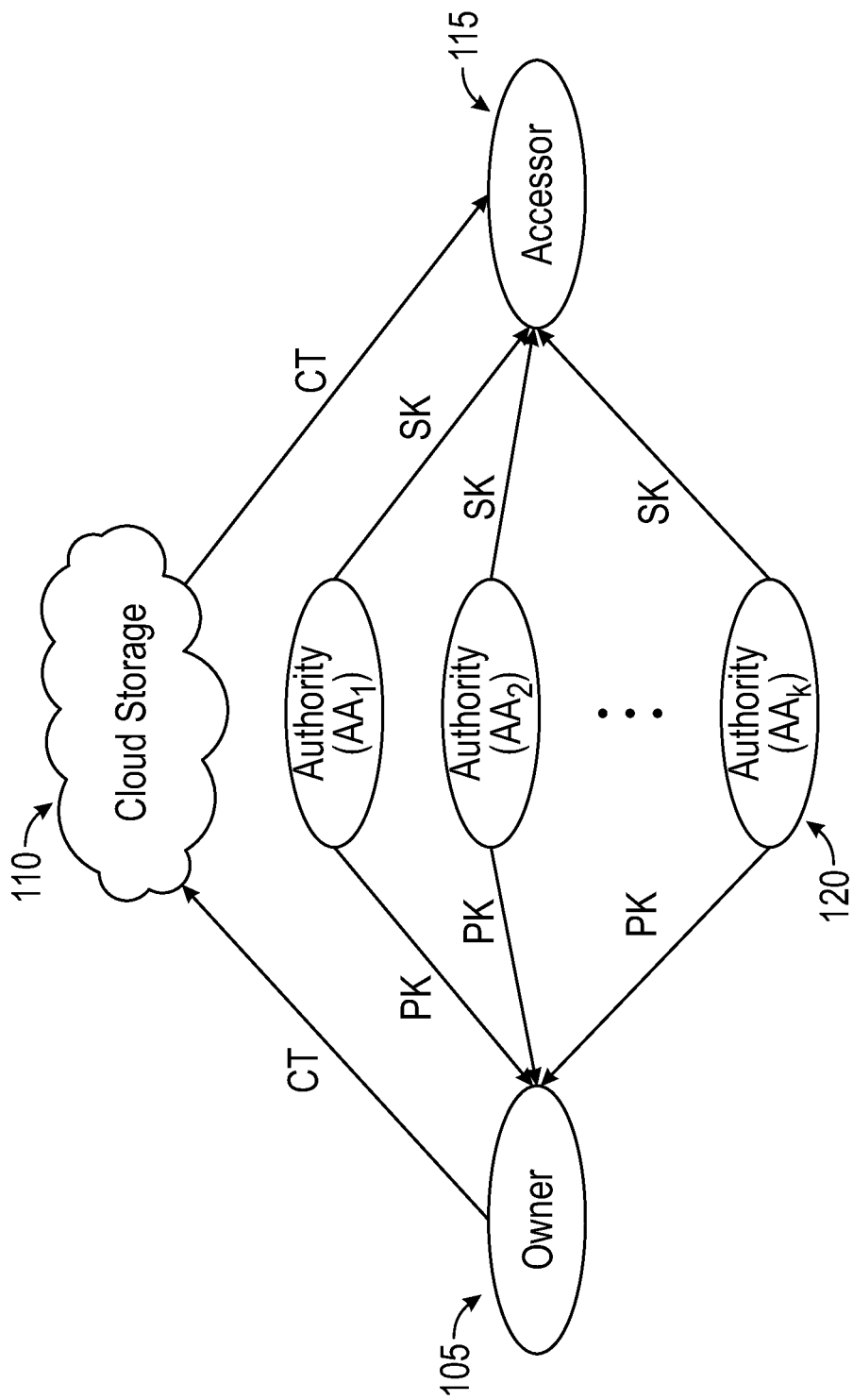
FIG. 1 illustrates an example system architecture for a decentralized multi-authority attribute-based encryption scheme.

In a standard ABE scheme, keys can only be generated and issued by a central authority. A natural extension of this notion, termed multi-authority ABE (MA-ABE), allows multiple parties to play the role of an authority. In an MA-ABE scheme, there are multiple authorities which control different attributes and each of them can issue secret keys to users possessing attributes under their control without any interaction with the other authorities in the system. Specifically, given a ciphertext generated with respect to some access policy, a user possessing a set of attributes satisfying the access policy can decrypt the ciphertext by pulling the individual secret keys it obtained from the various authorities controlling those attributes. The security requires the usual collusion resistance against unauthorized users with the important difference that now some of the attribute authorities may be corrupted and therefore may collude with the adversarial users.

Disclosed herein is a decentralized multi-authority attribute-based encryption (MA-ABE) scheme for a non-trivial class of access policies whose security is based (in the random oracle model) solely on the Learning With Errors (LWE) assumption. The supported access policies are ones described by Disjunctive Normal Form (DNF) formulas. All previous constructions of MA-ABE schemes supporting any non-trivial class of access policies were proven secure (in the random oracle model) assuming various assumptions on bilinear maps.

In the disclosed system, any party can become an authority and there is no requirement for any global coordination other than the creation of an initial set of common reference parameters. A party can simply act as a standard ABE authority by creating a public key and issuing private keys to different users that reflect their attributes. A user can encrypt data in terms of any DNF formulas over attributes issued from any chosen set of authorities. Finally, the system does not require any central authority. In terms of efficiency, when instantiating the scheme with a global bound s on the size of access policies, the sizes of public keys, secret keys, and ciphertexts, all grow with s.

Disclosed are new tools for building ciphertext-policy ABE (CP-ABE) schemes using LWE. This includes a provably secure CP-ABE scheme supporting access policies in NC that avoids the generic universal-circuit-based key-policy to ciphertext-policy transformation.

Also disclosed herein is a new MA-ABE scheme supporting an unbounded number of attribute authorities for access policies captured by DNF formulas. The scheme is proven secure in the random oracle model and relies on the hardness of the LWE problem.

Embodiments include a decentralized MA-ABE scheme for access policies captured by DNF formulas under the LWE assumption. The scheme is (statically) secure against an arbitrary collusion of parties in the random oracle model and assuming the LWE assumption with subexponential modulus-to-noise ratio.

In the disclosed MA-ABE scheme, any party can become an authority at any, point of time and there is no bound on the number of attribute authorities that can join the system or need for any global coordination other than the creation of an initial set of common reference parameters created during a trusted setup.

Disclosed here in a provably secure direct CP-ABE construction which avoids the generic universal-circuit-based key-policy to ciphertext-policy transformation. In particular, the disclosed approach deviates from previous LWE-based expressive ABE constructions that are in turn based on techniques inspired by fully homomorphic encryption. In contrast, the disclosed CP-ABE is based on useful properties of linear secret sharing schemes and can be viewed as the LWE analog of the CP-ABE scheme of Waters which relies on the decisional bilinear Diffie-Hellman assumption.

Embodiments also include a CP-ABE scheme supporting all access policies in $NC^1$. The scheme is selectively secure assuming the LWE assumption with subexponential modulus-to-noise ratio. The CP-ABE scheme achieves the standard selective security where the adversary must disclose its ciphertext query before the master public key is published but is allowed to make secret key queries adaptively throughout the security experiment. Embodiments of the CP-ABE construction further include an LWE-based direct construction of CP-ABE, including a CP-ABE scheme for all $NC^1$ assuming the LWE assumption. The CP-ABE scheme is amenable for extension to the multi-authority setting.

CP-ABE Scheme

Setup

For each attribute u in the system, sample, $A_u \in \mathbb{Z}_q^{n \times m}$ together a trapdoor $T_{A_u}$, and another uniformly random matrix $H_u \leftarrow \mathbb{Z}_q^{n \times m}$. Additionally sample $y \leftarrow \mathbb{Z}_q^n$. Output $$PK=(y,\{A_u\},\{H_u\})), SK=\{T_{A_u}\}$$

Key Generation for Attribute Set U

Let $\hat{t} \leftarrow noise^{m-1}$ and $t=(1, \hat{t}) \in \mathbb{Z}$. This vector t will intuitively serve as the linchpin that will tie together all the secret key components of a specific user. For each attribute $u \in U$, using $T_{A_u}$, sample a short vector $\bar{k}_u$ such that $A_u \bar{k}_u^T = H_u t^T$ and output $$SK=(\{\bar{k}_u\},t)$$

Encryption of Msg$\in\{0, 1\}$ Given Matrix M

Assume that $\rho$ is a function that maps between row indices of M and attributes, that is, $\rho(i)$ is the attribute associated with the ith row in M. The procedure samples $s \leftarrow \mathbb{Z}_q^n$ and $v_2, \ldots, v_{s_{max}} \leftarrow \mathbb{Z}_q^m$ and computes $c_i = sA_{\rho(i)} + \text{noise}$ $\hat{c}_i = M_{i,1}\left(sy^T, \overline{0, \ldots, 0}^{m-1}\right) + \left[\sum_{j \in \{2, \ldots, s_{max}\}} M_{i,j} v_j\right] - sH_{\rho(i)} + \text{noise}$ and outputs the ciphertext $CT = (\{c_i\}_{i \in [\ell]}, \{\hat{c}_i\}_{i \in [\ell]}, C = MSB(sy^T) \oplus \text{msg})$.

Decryption

Assume that the available attributes are qualified to decrypt. Let I be the set of row indices corresponding to the available attributes and let $\{w_i\}_{i \in I} \in \{0,1\} \subset \mathbb{Z}_q$ be the reconstruction coefficients. For each $i \in I$, let $\rho(i)$ be the attribute associated with the ith row. The procedure computes $K' = \sum_{i \in I} w_i (c_i \tilde{k}_{\rho(i)}^T + \hat{c}_i t^T)$ and outputs $\text{msg}' = C \oplus MSB(K')$.

MA-ABE Scheme

The MA-ABE scheme k a generalization of the above scheme.

Notations

We denote the underlying security parameter by $\lambda$. A function negl: $\mathbb{N} \to \mathbb{R}$ is negligible if it is asymptotically smaller than any inverse-polynomial function, namely, for every constant $c > 0$ there exists an integer $N_c$ such that $\text{negl}(\lambda) \leq \lambda^{-c}$ for all $\lambda > N_c$. We let $[n] = \{1, \ldots, n\}$.

Let PPT stand for probabilistic polynomial-time. For a distribution X, we write $x \leftarrow X$ to denote that x is sampled at random according to distribution X. For a set X, we write $x \leftarrow X$ to denote that x is sampled according to the uniform distribution over the elements of X, We use lower case letters, such as v, to denote vectors and upper-case, such as M, for matrices. We assume all vectors, by default, are row vectors. The jth row of a matrix is denoted $M_j$ and analogously for a set of row indices j, we denote $M_j$ for the submatrix of M that consists of the rows $M_j$ for all $j \in J$. For a vector v, we let $\|v\|$ denote its $\ell_2$ norm and $\|v\|_\infty$ denote its $\ell_\infty$ norm.

For an integer $q \geq 2$, we let $\mathbb{Z}_q$ denote the ring of integers modulo q. We represent $\mathbb{Z}_q$ as integers in the range $(-q/2, q/2]$.

Indistinguishability

Two sequences of random variables $X = \{\mathcal{X}_\lambda\}_{\lambda \in \mathbb{N}}$ and $Y = \{\mathcal{Y}_\lambda\}_{\lambda \in \mathbb{N}}$ are computationally indistinguishable if for any non-uniform PPT algorithm $\mathcal{A}$ there exists a negligible function $\text{negl}(\cdot)$ such that $|\Pr[\mathcal{A}(1^\lambda, X_\lambda) = 1] - \Pr[\mathcal{A}(1^\lambda, Y_\lambda) = 1]| \leq \text{negl}(\lambda)$ for all $\lambda \in \mathbb{N}$.

For two distributions D and D' over a discrete domain $\Omega$, the statistical distance between D and D' is defined as $SD(D, D') = (1/2) \cdot \sum_{\omega \in \Omega} |D(\omega) - D'(\omega)|$. A family of distributions $D = \{\mathcal{D}_\lambda\}_{\lambda \in \mathbb{N}}$ and $D' = \{\mathcal{D}'_\lambda\}_{\lambda \in \mathbb{N}}$, parameterized by security parameter $\lambda$, are said to be statistically indistinguishable if there is a negligible function $\text{negl}(\cdot)$ such that $SD(D_\lambda, D'_\lambda) \leq \text{negl}(\lambda)$ for all $\lambda \in \mathbb{N}$.

Lattices

An in-dimensional lattice $\mathcal{L}$ is a discrete additive subgroup of $\mathbb{R}^m$. Given positive integers n, m, q and a matrix $A \in \mathbb{Z}_q^{n \times m}$, we let $\lambda_q^\perp(A)$ denote the lattice $\{x \in \mathbb{Z}^m | Ax^T = 0^T \mod q\}$. For $u \in \mathbb{Z}_q^n$, we let $\lambda_q^u(A)$ denote the coset $\{x \in \mathbb{Z}^m | Ax^T = u^T \mod q\}$.

Discrete Gaussians

Let $\sigma$ be any positive real number. The Gaussian distribution $D_\sigma$ with parameter $\sigma$ is defined by the probability distribution function $p_\sigma(x) = \exp(-\pi \|x\|^2 / \sigma^2)$. For any discrete set $\mathcal{L} \subseteq \mathbb{R}^m$, define $\rho_\sigma(\mathcal{L}) \sum_{x \in \mathcal{L}} \rho_\sigma(x)$. The discrete Gaussian distribution $\mathcal{D}_{\mathcal{L}, \sigma}$ over $\mathcal{L}$ with parameter $\sigma$ is defined by the probability distribution function $\rho_{\mathcal{L}, \sigma}(x) = \rho_\sigma(x) / \rho_\sigma(\mathcal{L})$.

Truncated Discrete Gaussians

The truncated discrete Gaussian distribution over $\mathbb{Z}^m$ with parameter $\sigma$, denoted by $\tilde{\mathcal{D}}_{\mathbb{Z}^m, \sigma}$, is the same as the discrete Gaussian distribution $\mathcal{D}_{\mathbb{Z}^m, \sigma}$ except that it outputs 0 whenever the $\ell_\infty$ norm exceeds $\sqrt{m}\sigma$. Note that, by definition, $\tilde{\mathcal{D}}_{\mathbb{Z}^m, \sigma}$ is $\sqrt{m}\sigma$-bounded

Lattice Trapdoors

Lattices with trapdoors are lattices that are indistinguishable from randomly chosen lattices, but have certain "trapdoors" that allow efficient solutions to hard lattice problems. A trapdoor lattice sampler, denoted LT = (TrapGen, SamplePre), consists of two algorithms with the following syntax and properties:

TrapGen $(1^n, 1^m, q) \mapsto (A, T_A)$: The lattice generation algorithm is a randomized algorithm that takes as input the matrix dimensions n, m, modulus q, and outputs a matrix $A \in \mathbb{Z}_q^{n \times m}$ together with a trapdoor $T_A$.

SamplePre $(A, T_A, \sigma, u) \mapsto s$: The presampling algorithm takes as input a matrix A, trapdoor $T_A$, a vector $u \in \mathbb{Z}_q^n$, and a parameter $\sigma \in \mathbb{R}$ (which determines the length of the output vectors). It outputs a vector $s \in \mathbb{Z}_q^m$ such that $A \cdot s^T = u^T$ and $\|s\| \leq \sqrt{m} \cdot \sigma$.

Well-Sampledness

We further require that the aforementioned sampling procedures output well-sampled elements. That is, the matrix outputted by TrapGen looks like a uniformly random matrix, and the preimage outputted by SamplePre with a uniformly random vector/matrix is indistinguishable from a vector/matrix with entries drawn from an appropriate Gaussian distribution.

Enhanced Trapdoor Sampling

Let q: $\mathbb{N} \to \mathbb{N}$, $\sigma$: $\mathbb{N} \to \mathbb{R}^+$ be functions and LT = (TrapGen, SamplePre) be a trapdoor lattice sampler satisfying the q-well-sampledness of matrix and (q, $\sigma$)-well-sampledness of preimage properties. We describe enhanced trapdoor lattice sampling algorithms EnLT = (EnTrapGen, EnSamplePre).

EnTrapGen $(1^n, 1^m, q) \mapsto (A, T_A)$: The trapdoor generation algorithm generates two matrices $A_1 \in \mathbb{Z}_q^{n - \lceil m/2 \rceil}$ and $A_2 \in \mathbb{Z}_q^{n - \lceil m/2 \rceil}$ as $(A_1, T_{A_1}) \leftarrow \text{TrapGen}(1^n, 1^{\lceil m/2 \rceil}, q)$, $(A_2, T_{A_2}) \leftarrow \text{TrapGen}(1^n, 1^{\lceil m/2 \rceil}, q)$. It appends both matrices column-wise to obtain a larger matrix A as $A = (A_1 | A_2)$ and sets the associated trapdoor $T_A$ to be the combined trapdoor information $T_A = (T_{A_1}, T_{A_2})$.

EnSamplePre $(A, T_A, \sigma, Z) \mapsto S$: The pre-image sampling algorithm takes as input a matrix $A = (A_1 | A_2)$ with trapdoor $T_A = (T_{A_1}, T_{A_2})$, a parameter $\sigma = \sigma(\lambda)$, and a matrix $Z \in \mathbb{Z}_q^{n \times k}$. It chooses a uniformly random matrix $W \leftarrow \mathbb{Z}_q^{n \times k}$ and sets $Y = Z - W$. Next, it computes matrices $S_1, S_2 \in \mathbb{Z}^{\lceil m/2 \rceil \times k}$ as $S_1 \leftarrow \text{SamplePre}(A_1, T_{A_1}, \sigma, W)$ and $S_2 \leftarrow \text{SamplePre}(A_2, T_{A_2}, \sigma, Y)$. It computes the final output matrix $S \in \mathbb{Z}^{m \times k}$ by column-wise appending matrices $S_1$ and $S_2$ as $S = (S_1 | S_2)$.

Learning With Errors

For a security parameter $\lambda \in \mathbb{N}$, let n: $\mathbb{N} \to \mathbb{N}$, q: $\mathbb{N} \to \mathbb{N}$, and $\sigma$: $\mathbb{N} \to \mathbb{R}^+$ be functions of $\lambda$. The Learning with Errors (LWE) assumption $\text{LWE}_{n,q,\sigma}$, parametrized by $n = n(\lambda)$, $q = q$ ($\lambda$), $\sigma=\sigma(\lambda)$, states that for any PPT adversary $\mathcal{A}$, there exists a negligible function negl(•) such that for any $A \in \mathbb{N}$, $$\mathrm{Adv}_{\mathcal{A}}^{LWE_{n,q,\sigma}}(\lambda) \triangleq |\mathrm{Pr}[1 \leftarrow \mathcal{A}^{\mathcal{O}_1^s(\cdot)}(1^\lambda)|s \leftarrow \mathbb{Z}_q^n] - \mathrm{Pr}$$
$$[1 \leftarrow \mathcal{A}^{\mathcal{O}_2(\cdot)}(1^\lambda)]| \leq \mathrm{negl}(\lambda)$$

where the oracles $\mathcal{O}_1^s(\cdot)$ and $\mathcal{O}_2(\cdot)$ are defined as follows: $\mathcal{O}_1^s(\cdot)$ has $s \in \mathbb{Z}_q^n$ hardwired, and on each query it chooses $a \leftarrow \mathbb{Z}_q^n$, $e \leftarrow \mathcal{D}_{\mathbb{Z},\sigma}$ and outputs $(a, sa^T+e \bmod q)$, and $\mathcal{O}_2(\cdot)$ on each query chooses $a \leftarrow \mathbb{Z}_q^n$, $u \leftarrow \mathbb{Z}_q$ and outputs $(a, u)$.

Given the current state of the art of lattice problems, the LWE assumption is believed to be true for any polynomial $n(\cdot)$ and any functions $q(\cdot), \sigma(\cdot)$ such that for all $\lambda \in \mathbb{N}$, $n=n(\lambda)$, $q=q(\lambda)$, $\sigma=\sigma(\lambda)$ satisfy the following constraints:

$$2\sqrt{n} < \sigma < q < 2^n, n \cdot \frac{q}{\sigma} < 2^{n^\epsilon}, \text{ and } 0 < \epsilon < 1/2$$

The Notion of CP-ABE for Linear Secret Sharing Schemes

A ciphertext-policy attribute-based encryption (CP-ABE) scheme CP-ABE=(Setup, KeyGen, Enc, Dec) for access structures captured by linear secret sharing schemes (LESS) over some finite field $\mathbb{Z}_q$ with $q=q(\lambda)$ includes four procedures with the following syntax.

Setup $(1^\lambda, \mathbb{U}) \mapsto (\mathrm{PK}, \mathrm{MSK})$: The setup algorithm takes in the security parameter $\lambda$ in unary and attribute universe description $\mathbb{U}$, and outputs public parameters PK and a master secret key MSK. We assume that PK includes the description of the attribute universe $\mathbb{U}$.

KeyGen $(\mathrm{MSK}, \mathbb{U}) \mapsto \mathrm{SK}$: The key generation algorithm takes as input the master secret key MSK and a set of attributes $U \subseteq \mathbb{U}$, and outputs a private key SK. We assume that the secret key implicity contains the attribute set Lf.

Enc $(\mathrm{PK}, \mathrm{msg}, (M,\rho)) \mapsto \mathrm{CT}$: The encryption algorithm takes in the public parameters PK, a message msg, and an LSSS access policy $(M,\rho)$ such that M is a matrix over $\mathbb{Z}_q$ and $\rho$ is a row-labeling function that assigns to each row of M an attribute in $\mathbb{U}$. The algorithm outputs a ciphertext CT. We assume that the ciphertext implicitly contains $(M,\rho)$.

Dec(PK, CT, SK) $\mapsto$ msg': The decryption algorithm takes in the public parameters PK, a ciphertext CT generated with respect to some LSSS access policy $(M,\rho)$, and a secret key SK for some set of attributes $U \subset \mathbb{U}$. It outputs a message msg' when the attributes in LI satisfies the LSSS access policy $(M,\rho)$, i.e., when the vector $(1, 0, \ldots, 0)$ lies in the linear span of those rows of the access matrix M which are mapped by $\rho$ to some attribute in U. Otherwise, decryption fails.

Notion of MA-ABE for Linear Secret Sharing Schemes

A mufti-authority attribute-based encryption (MA-ABE) system MA-ABE=(GlobalSetup, AuthSetup, KeyGen, Enc, Dec) for access structures captured by linear secret sharing schemes LSSS over some finite field $\mathbb{Z}_q$ with $q=q(\lambda)$ consists of five procedures with the following syntax. We denote by $\mathcal{A}$ U the authority universe and by $\mathcal{G}$ID the universe of global identifiers of the users. Additionally, we assume that each authority controls just one attribute, and hence we would use the words 'authority" and 'attribute" interchangeably. This definition naturally generalizes to the situation in which each authority can potentially control an arbitrary number of attributes.

GlobalSetup $(1^\lambda) \mapsto$ GP: The global setup algorithm takes in the security parameter $\lambda$ in unary and outputs the global public parameters GP for the system. We assume that GP includes the descriptions of the universe of attribute authorities $\mathcal{A}$ U and universe of the global identifiers of the users $\mathcal{G}$ID.

AuthSetup (GP, u) $(\mathrm{PK}_u, \mathrm{SK}_u)$: The authority $u \in \mathcal{A}$ U calls the authority setup algorithm during its initialization with the global parameters GP as input and receives back its public and secret key pair $\mathrm{PK}_u, \mathrm{SK}_u$.

KeyGen (GP, GID, $\mathrm{SK}_u$) $\mapsto \mathrm{SK}_{GID,u}$: The key generation algorithm takes as input the global parameters GP, a user's global identifier $\mathrm{GID} \in \mathcal{G}ID$, and a secret key $\mathrm{SK}_u$ of an authority $u \in \mathcal{A}$ U. It outputs a secret key $\mathrm{SK}_{GID,u}$ for the user.

Enc (GP, msg, $(M,\rho)$, $\{\mathrm{PK}_u\}$) $\mapsto$ CT: The encryption algorithm takes in the global parameters GP, a message msg, an LSSS access policy $(M,\rho)$ such that M is a matrix over $\mathbb{Z}_q$ and $\rho$ is a row-labeling function that assigns to each row of M an attribute/authority in $\mathcal{A}$ U, and the set $\{\mathrm{PK}_u\}$ of public keys for all the authorities in the range of $\rho$. It outputs a ciphertext CT. We assume that the ciphertext implicitly contains $(M,\rho)$.

Dec(GP, CT, $\{\mathrm{SK}_{GID,u}\}$) $\mapsto$ msg': The decryption algorithm takes in the global parameters GP, a ciphertext CT generated with respect to some LSSS access policy $(M,\rho)$, and a collection of keys $\{\mathrm{SK}_{GID,u}\}$ corresponding to user ID-attribute pairs (GID, U) possessed by a user with global identifier GID. It outputs a message msg' when the collection of attributes associated with the secret keys $\{\mathrm{SK}_{GID,u}\}$ satisfies the LSSS access policy $(M,\rho)$, i.e., when the vector $(1, 0, \ldots, 0)$ is contained in the linear span of those rows of M which are mapped by $\rho$ to some attribute/authority $u \in \mathcal{A}$ U such that the secret key $\mathrm{SK}_{GID,u}$ is possessed by the user with global identifier GID. Otherwise, decryption fails.

Linear Secret Sharing Schemes with Linear Independence

A secret sharing scheme consists of a dealer who holds a secret and a set of n parties. Informally, the dealer "splits" the secret into "shares" and distributes them among the parties. Subsets of parties which are "authorized" should be able to jointly recover the secret while others should not. The description of the set of authorized sets is called the access structure.

Access Structures: An access structure on n parties associated with numbers in [n] is a set $\mathbb{A} \subseteq 2^{[n]} \setminus \emptyset$ of non-empty subsets of parties. The sets in $\mathbb{A}$ are called the authorized sets and the sets not in $\mathbb{A}$ are called the unauthorized sets. An access structure is called monotone if $\forall B, C \in 2^{[n]}$ if $B \in \mathbb{A}$ and $B \subseteq C$, then $C \in \mathbb{A}$.

A secret sharing scheme for a monotone access structure $\mathbb{A}$ is a randomized algorithm that on input a secret z outputs n shares $\mathrm{sh}_1, \ldots, \mathrm{sh}_n$ such that for any $A \in \mathbb{A}$ the shares $\{\mathrm{sh}_i\}_{i \in A}$ determine z and other sets are independent of z (as random variables).

Non-Monotone Secret Sharing

A natural generalization of the above notion that captures all access structures (rather than only monotone ones) is called non-monotone secret sharing. Concretely, a non-monotone secret sharing scheme for an access structure $\mathbb{A}$ is a randomized algorithm that on input a secret z outputs 2n shares viewed as n pairs $(\mathrm{sh}_{1,0}, \mathrm{sh}_{1,1}), \ldots, (\mathrm{sh}_{n,0}, \mathrm{sh}_{n,1})$ such that for any $A \in \mathbb{A}$ the shares $\{\mathrm{sh}_{i,1}\}_{i \in A} \cup \{\mathrm{sh}_{i,0}\}_{i \notin A}$ determine z and other sets are independent of z.

A subset of all (non-monotone) secret sharing schemes where the reconstruction procedure is a linear function of the shares are known as linear (non-monotone) secret sharing schemes.

Linear (Non-Monotone) Secret Sharing Schemes

Let $q \in \mathbb{N}$ be a prime power and [n] be a set of parties. A non-monotone secret-sharing scheme $\Pi$ with domain of secrets $\mathbb{Z}_q$ realizing access structure $\mathbb{A}$ on parties [n] is linear over $\mathbb{Z}$ if 1. Each share $sh_{i,b}$ for $i \in [n]$ and $b \in [0,1]$ of a secret $z \in \mathbb{Z}_q$ forms a vector with entries in $\mathbb{Z}_q$.
2. There exists a matrix $M \in \mathbb{Z}_q^{\ell \times d}$, called the share-generating matrix, and a function $\rho: [\ell] \to [2n]$, that labels the rows of $M$ with a party index from $[n]$ or its corresponding negation, represented as another party index from $\{n+1, \ldots, 2n\}$, which satisfy the following: During the generation of the shares, we consider the vector $v = (z, r_2, \ldots, r_d) \in \mathbb{Z}_q^d$. Then the vector of $\ell$ shares of the secret $z$ according to $\Pi$ is equal to $sh = M \cdot v^T \in \mathbb{Z}_q^{\ell \times 1}$. For $i \in [n]$ and $b \in \{0,1\}$, the share $sh_{i,b}$ consists of all $sh_j$ values for which $\rho(j) = n \cdot (1-b) + i$ (so the first n shares correspond to the "1 shares" and the last n shares correspond to the "0 shares"). The pair $(M, \rho)$ is referred to as the LSSS policy of the access structure $\mathbb{A}$.

It is well known that the above method of sharing a secret satisfies the desired correctness and security of a non-monotone secret sharing scheme as defined above. For an LSSS policy $(M, \rho)$, where $M \in \mathbb{Z}_q^{\ell \times d}$ and $\rho: [\ell] \to [2n]$, and a set of parties $S \subseteq [n]$, let $\hat{S} = S \cup \{i \in \{n+1, \ldots, 2n\} | i - n \notin S\} \subset [2n]$. We denote $M_{\hat{S}}$ the submatrix of $M$ that consists of all the rows of $M$ that "belong" to $\hat{S}$ according to $\rho$ (i.e., rows $j$ for which $\rho(j) \in \hat{S}$).

Correctness means that if $S \subseteq [n]$ is authorized, the vector $(1, \underbrace{0, \ldots, 0}_{d-1}) \in \mathbb{Z}_q^d$ is in the span of the rows of $M_{\hat{S}}$. Security means that if $S \subseteq [n]$ is unauthorized, the vector $(1, 0, \ldots, 0)$ is not in the span of the rows of $M_{\hat{S}}$. Also, in the unauthorized case, there exists a vector $d \in \mathbb{Z}_q^d$, such that its first component $d_1 = 1$ and $M_{\hat{S}} d^T = 0$, where $0$ is the all 0 vector.

A special subset of all linear secret sharing schemes are ones where the reconstruction coefficients are always binary. We call such LSSS {0,1}-LSSS, The above sharing and reconstruction methods directly extend to sharing a vector $z \in \mathbb{Z}_q^m$ of dimension $m \in \mathbb{N}$ rather than just scalars.

Ciphertext-Policy ABE Scheme

The ciphertext-policy ABE (CP-ABE) scheme supporting access structures represented by $NC^1$ circuits is described below. In the scheme description, it is assumed for simplicity of presentation that both the encryption and the decryption algorithms receive an access policy directly in its LSSS representation. However, in the actual implementation, the encryption and decryption algorithms could instead take in the circuit representation of the access policy and deterministically compute its LSSS representation. This is because, without the circuit description of an access policy, the decryption algorithm may not be able to efficiently determine the {0,1} reconstruction coefficients needed for a successful decryption.

First, we provide the parameter constraints required by our correctness and security proof. Fix any $0 < \epsilon < \frac{1}{2}$. For any $B \in \mathbb{N}$, let $U_B$ denote the uniform distribution on $\mathbb{Z} \cap [-B, B]$, i.e., integers between $\pm B$. The Setup algorithm chooses parameters $n, m, \sigma, q$ and noise distributions $X_{lwe}, X_1, X_2, X_{big}$, satisfying the following constraints:

$n = \text{poly}(\lambda)$, $\sigma < q$, $n \cdot q / \sigma < 2^{n^\epsilon}$, $X_{lwe} = \tilde{D}_{\mathbb{Z},\sigma}$ (for LWE security)

$m > 2 s_{max} n \log q + \omega \log n + 2\lambda$ (for enhanced trapdoor sampling and LHL)

$\sigma > \sqrt{s_{max} n \log q \log m} + \lambda$ (for enhanced trapdoor sampling)

$X_1 = \tilde{D}_{\mathbb{Z}^{m-1},\sigma}$, $X_2 = \tilde{D}_{\mathbb{Z}^m,\sigma}$ (for enhanced trapdoor sampling)

$X_{big} = U_B$, where $B > (m^{3/2} \sigma + 1) 2^\lambda$ (for smudging/security)

$|\mathbb{U}| \cdot 3 m^{3/2} \sigma B < q/4$ (for correctness)

CP-ABE Construction

Setup $(1^\lambda, s_{max}, \mathbb{U})$

The setup algorithm takes in the security parameter $\lambda$ encoded in unary, the maximum width $s_{max} = s_{max}(\lambda)$ of an LSSS matrix supported by the scheme, and the attribute universe $\mathbb{U}$ associated with the system. It first chooses an LWE modulus $q$, dimensions $n, m$, and also distributions $X_{lwe}, X_1, X_2, X_{big}$ as described above. Next, it chooses a vector $y \leftarrow \mathbb{Z}_q^n$ and a sequence of matrices $\{H_u\}_{u \in \mathbb{U}} \leftarrow \mathbb{Z}_q^{n \times m}$. Then, it samples pairs of matrices with trapdoors $\{(A_u, T_{A_u})\}_{u \in \mathbb{U}} \leftarrow \text{EnTrapGen}(1^n, 1^m, q)$. Finally, it outputs $PK = (n, m, q, X_{lwe}, X_1, X_2, X_{big}, y, \{A_u\}_{u \in \mathbb{U}}, \{H_u\}_{u \in \mathbb{U}})$, $MSK = \{T_{A_u}\}_{u \in \mathbb{U}}$ KeyGen (MSK, U)

The key generation algorithm takes as input the master secret key MSK, and a set of attributes $U \subseteq \mathbb{U}$. It samples a vector $\hat{t} \leftarrow X_1$ and sets the vector $t = (1, \hat{t}) \in \mathbb{Z}^m$. For each $u \in U$, it samples vectors $\hat{k}_u \leftarrow X_{big}^m$ and $\tilde{k}_u \leftarrow \text{EnSamplePre}(A_u, T_{A_u}, \sigma, tH_u^T - \hat{k}_u A_u^T)$, and sets $k_u = \hat{k}_u + \tilde{k}_u$. Finally, it outputs $SK = (\{k_u\}_{u \in U}, t)$.

Enc (PK, msg, $(M, \rho)$)

The encryption algorithm takes as input the public parameters PK, a message $msg \in \{0,1\}$ to encrypt, and an LSSS access policy $(M, \rho)$, where $M = (M_{i,j})_{\ell \times s_{max}} \in \{-1, 0, 1\}^{\ell \times s_{max}} \subset \mathbb{Z}_q^{\ell \times s_{max}}$ and $\rho: [\ell] \to \mathbb{U}$. The function $\rho$ associates rows of $M$ to attributes in $\mathbb{U}$. We assume that $\rho$ is an injective function. The procedure samples vectors $s \leftarrow \mathbb{Z}_q^n$ and $\{v_j\}_{j \in \{2, \ldots, s_{max}\}} \leftarrow \mathbb{Z}_q^m$. It additionally samples vectors $\{e_i\}_{i \in [\ell]} \leftarrow X_{lwe}^m$, and $\{\hat{e}_i\}_{i \in [\ell]} \leftarrow X_{big}^m$. For each $i \in [\ell]$, it computes vectors $c_i, \hat{c}_i \in \mathbb{Z}_q^m$ as follows:

$c_i = s A_{\rho(i)} + e_i$ $\hat{c}_i = M_{i,1} \left( s y^T, \underbrace{0, \ldots, 0}_{m-1} \right) + \left[ \sum_{j \in \{2, \ldots, s_{max}\}} M_{i,j} v_j \right] - s H_{\rho(i)} + \hat{e}_i$ and outputs $CT = ((M, \rho), \{c_i\}_{i \in [\ell]}, \{\hat{c}_i\}_{i \in [\ell]}, C = MSB(s y^T) \oplus msg)$.

Dec(PK, CT, MSK)

Decryption takes as input the public parameters PK, a ciphertext CT encrypting some message under some LSSS access policy $(M, \rho)$, and the secret key SK corresponding to some subset of attributes $U \subseteq \mathbb{U}$. If $(1, 0, \ldots, 0)$ is not in the span of the rows of $M$ associated with $U$, then decryption fails. Otherwise, let $I$ be a set of row indices of the matrix $M$ such that $\forall i \in I: \rho(i) \in U$ and let $\{w_i\}_{i \in I} \in \{0,1\} \subset \mathbb{Z}_q$ be scalars such that $\Sigma_{i \in I} w_i M_i = (1, 0, \ldots, 0)$, where $M_i$ is the $i^{th}$ row of $M$. The procedure computes $K' = \Sigma_{i \in I} w_i (c_i k_{\rho(i)}^T - \hat{c}_i^T)$ and outputs $msg' = C \oplus MSB(K')$.

Multi-Authority ABE Scheme

The MA-ABE scheme for access structures represented by DNF formulas is described below. The scheme is associated with a universe of global identifiers $\mathcal{G}\mathrm{ID} \subset \{0,1\}^*$, a universe of authority identifiers $\mathcal{A}\mathrm{U}$, and we will use the Lewko-Waters transformation to represent the DNF access policies as monotone LSSS. We will assume each authority controls only one attribute in our scheme. However, it can be readily generalized to a scheme where each authority controls an a priori bounded number of attributes using standard techniques. Further, we will assume that all access policies $(M,\rho)$ used in our scheme correspond to a matrix M with at most $s_{max}$ columns and an injective row-labeling function $\rho$, i.e., an authority/attribute is associated with at most one row of M. Since the Lewko-Waters transformation introduces a new column for the resulting LSSS matrix for each AND gate in the underlying formula, the bound in the number of columns of the LSSS matrices naturally translates to the number of AND gates of the supported DNF formulas at implementation. Similar to our CP-ABE scheme, in our scheme description below, we assume for simplicity of presentation that both the encryption and the decryption algorithms receive an access policy directly in its LSSS representation. However, we note that in the actual implementation, the encryption and decryption algorithms should instead take in the DNF representation of the access policy and deterministically compute its LSSS representation using the Lewko-Waters transformation algorithm.

First, we provide the parameter constraints required by our correctness and security proof. Fix any $0 < \epsilon < \frac{1}{2}$. For any $B \in \mathbb{N}$, let $U_B$ denote the uniform distribution on $\mathbb{Z} \cap [-B, B]$, i.e., integers between $\pm B$. The Setup algorithm chooses parameters n, m, σ, q and noise distributions $X_{lwe}$, $X_1$, $X_2$, $X_{big}$, satisfying the following constraints:

$n = \mathrm{poly}(\lambda)$, $\sigma < q$, $n \cdot q / \sigma < 2^{n^\epsilon}$, $X_{lwe} = \widetilde{D}_{\mathbb{Z},\sigma}$     (for LWE security)

$m > 2 s_{max} n \log q + \omega \log n$ (for enhanced trapdoor sampling and LHL)

$\sigma > \sqrt{s_{max} n \log q \log m} + \lambda$     (for enhanced trapdoor sampling)

$X_1 = \widetilde{D}_{\mathbb{Z}^{m-1},\sigma}$, $X_2 = \widetilde{D}_{\mathbb{Z}^m,\sigma}$     (for enhanced trapdoor sampling)

$X_{big} = U_{\hat{B}}$, where $\hat{B} > m^{3/2} \sigma 2^\lambda$     (for smudging/security)

$|\mathcal{A}\mathrm{U}|(m^{3/2} \sigma^2 + 2m \hat{B}) < q/4$     (for correctness)

MA-ABE Construction

GlobalSetup $(1^\lambda, s_{max})$

The global setup algorithm takes in the security parameter $\lambda$ encoded in unary and the maximum width $s_{max} = s_{max}(\lambda)$ of an LSSS matrix supported by the scheme. It first chooses an LWE modulus q, dimensions n, m, and also distributions $X_{lwe}$, $X_1$, $X_2$, $X_{big}$ as described above. Next, it samples a vector $y \leftarrow \mathbb{Z}_q^n$ and sets the matrix $B_1 \in \mathbb{Z}_q^{n \times m}$ as $$B_1 = \left[ y^T \| 0^T \| \overset{m-1}{\cdots} \| 0^T \right],$$

where each $0 \in \mathbb{Z}_q^n$. Furthermore, we assume a hash function H: $\mathcal{G}\mathrm{ID} \to \mathbb{Z} \cap [-\hat{B}, \hat{B}])^{m-1}$ mapping strings $\mathrm{GID} \in \mathcal{G}\mathrm{ID}$ to random $(m-1)$-dimensional vectors of integers in the interval $[-\hat{B}, \hat{B}]$. H will be modeled as a random oracle in the security proof. Finally, it outputs the hash function H and the global parameters $GP = (n, m, q, s_{max}, X_{lwe}, X_1, X_2, X_{big}, B_1)$.

AuthSetup (GP, H, u)

Given the global parameters GP, the hash function H, and an authority identifier $u \in \mathcal{A}\mathrm{U}$, the algorithm generates a matrix-trapdoor pair $(A_u, T_{A_u}) \leftarrow \mathrm{EnTrapGen}(1^n, 1^m, q)$ such that $A_u \in \mathbb{Z}_q^{n \times m}$ samples another matrix $H_u \in \mathbb{Z}_q^{n \times m}$, and outputs the pair of public key and secret key for the authority u $PK_u = (A_u, H_u), MSK_u = T_{A_u}$.

KeyGen (GP, H, GID, $MSK_u$)

The key generation algorithm takes as input the global parameters GP, the hash function H, the user's global identifier GID, and the authority's secret key $MSK_u$. It first computes the vector $t_{GID} = (1, H(GID)) \in \mathbb{Z}^m$. Next, it chooses a vector $\hat{k}_{GID,u} \leftarrow X_{big}^m$, samples a vector $\tilde{k}_{GID,u} \leftarrow \mathrm{EnSamplePre}(A_u, T_{A_u}, \sigma, t_{GID} H_u^T - \hat{k}_{GID,u} A_u^T)$, and outputs the secret key for the user GID as $SK_{GID,u} = \tilde{k}_{GID,u} + \hat{k}_{GID,u}$.

Enc (GP, H, msg, $(M,\rho)$, $\{PK_u\}$)

The encryption algorithm takes as input the global parameters GP, the hash function H, a message bit $msg \in \{0,1\}$ to encrypt, an LSSS access policy $(M,\rho)$ generated by the Lewko-Waters transformation, where $MC = (M_{i,j})_{\ell \times s_{max}} \in \{-1, 0, 1\}^{\ell \times s_{max}} \subset \mathbb{Z}_q^{\ell \times s_{max}}$ and $\rho: [\ell] \to \mathcal{A}\mathrm{U}$, and public keys of the relevant authorities $\{PK_u\}$. The function $\rho$ associates rows of M to authorities (recall that we assume that each authority controls a single attribute). We assume that $\rho$ is an injective function. The procedure samples vectors $s \leftarrow \mathbb{Z}_q^n$, $\{v_j\}_{j \in \{2, \ldots, s_{max}\}} \leftarrow \mathbb{Z}_q^m$, and $\{x_i\}_{i \in [\ell]} \leftarrow \mathbb{Z}_q^n$. It additionally samples vectors $\{e_i\}_{i \in [\ell]} \leftarrow X_{lwe}^m$ and $\{\hat{e}_i\}_{i \in [\ell]} \leftarrow X_{big}^m$. For each $i \in [\ell]$, it computes vectors $c_i, \hat{c}_i \in \mathbb{Z}_q^m$ as follows:

$$c_i = x_i A_{\rho(i)} + e_i$$

$$\hat{c}_i = M_{i,1} s B_1 + \left[ \sum_{j \in \{2, \ldots, s_{max}\}} M_{i,j} v_j \right] - x_i H_{\rho(i)} + \hat{e}_i$$

and outputs $CT = ((M,\rho), \{c_i\}_{i \in [\ell]}, \{\hat{c}_i\}_{i \in [\ell]}, C = MSB(sy^T) \oplus msg)$.

Dec(GP, H, CT, GID, $SK_{GID,u}$)

Decryption takes as input the global parameters GP, the hash function H, a ciphertext CT generated with respect to an LSSS access policy $(M,\rho)$ generated by the Lewko-Waters transformation, a user identity GID, and the secret keys $\{SK_{GID,\rho(i)}\}_{i \in I}$ corresponding to a subset I of row indices of the access matrix M possessed by that user. If $(1, 0, \ldots, 0)$ is not in the span of the rows of M having indices in the set I, then decryption fails. Otherwise, let $\{w_i\}_{i \in I} \in \{0,1\} \subset \mathbb{Z}_q$ be scalars such that $\Sigma_{i \in I} w_i M_i = (1, 0, \ldots, 0)$, where $M_i$ is the ith row of M. The existence of such scalars $\{w_i\}_{i \in I}$ and their efficient determination are guaranteed. The algorithm computes the vector $t_{GID} = (1, H(GID)) \in \mathbb{Z}^m$ followed by $$K' = \sum_{i \in I} w_i \cdot \left( c_i SK_{GID,\rho(i)}^T + \hat{c}_i t_{GID}^T \right),$$

and outputs $msg' = C \oplus MSB(K')$.

System Implementation

With reference to FIG. 1, an example system architecture for a decentralized multi-authority attribute-based encryption scheme is illustrated. The Owner 105 of a message, such any arbitrary data, can encrypt the message as described herein and store the resulting ciphertext in a Cloud Storage 110. Another user, illustrated as Accessor 115, may retrieve this ciphertext from Cloud Storage 110. Multiple Authorities 120 may be instantiated for managing public and secret keys. The Authorities 120 may distribute private key to data Owner 105, and secret keys to Accessor 115. As described herein, the user can only decrypt the ciphertext if the user has at least the predetermined number of attributes from the requisite authorities.

Figure 2:
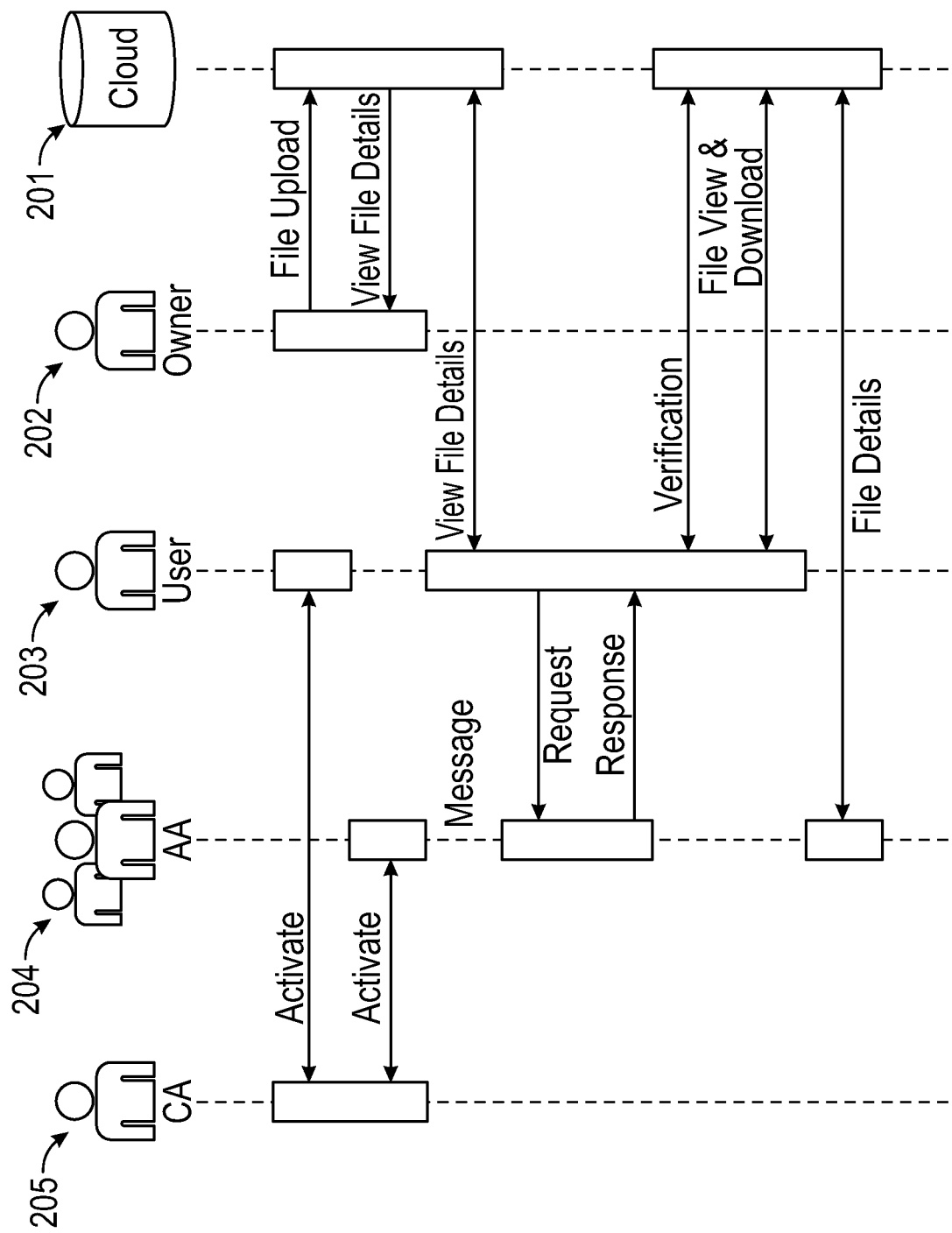
FIG. 2 illustrates an example sequence diagram for a decentralized multi-authority attribute-based encryption scheme.

With reference to FIG. 2, an example sequence diagram for a decentralized multi-authority attribute-based encryption scheme is illustrated. Arbitrary data may be stored in Cloud 201. Data Owner 202 may have caused the data to be uploaded to the cloud. Subsequently, User 203 may wish to obtain the data from the Cloud 201. User 203 may initially view file details and request a key from Authority 204. While only a single Authority 204 is illustrated here, multiple authorities can be instantiated and the user may be in communication with multiple of the authorities.

Figure 3:
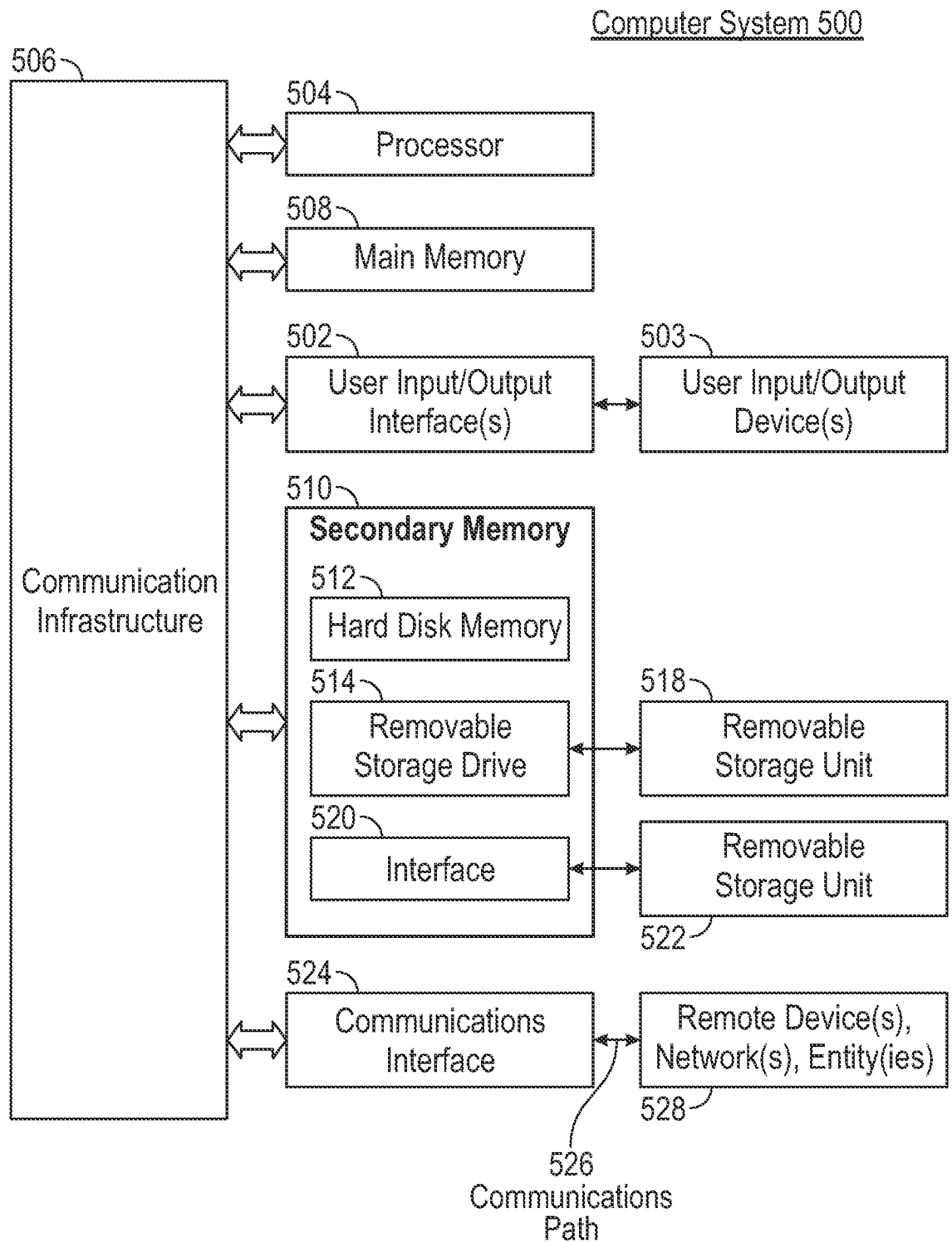
FIG. 3 illustrates an example computer system architecture for implementing the claimed systems and methods.
Figure 4:
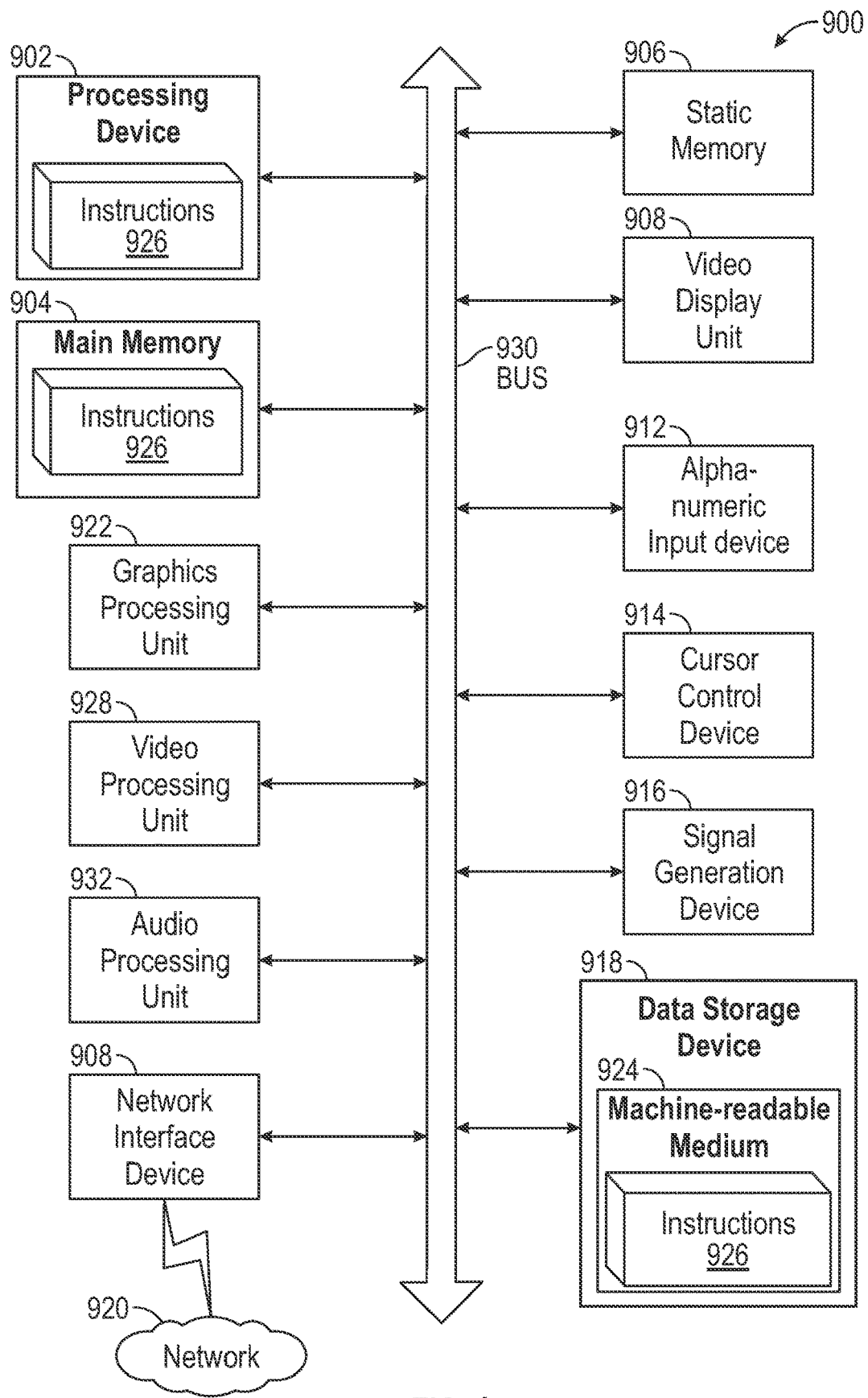
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed Cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (Paas), desktop as a service (DaaS), framework as a service (FaaS), backend as a service (Baas), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets, Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized method for encrypting a message according to a multi-authority attribute-based encryption scheme, the method comprising:

storing an electronic message m comprising $m_i$ bits for encryption in a computerized storage medium;

executing a global setup algorithm to generate global parameters by:

selecting LWE parameters and a noise distribution;

generating a matrix B with a first column of data y of random elements and the remainder set as all 0s except the diagonal which is set to be 1;

executing an authority setup algorithm to generate a public and secret key pair of an authority, by:

generating a first LWE matrix A;

generating a second LWE matrix H;

setting the public key of the authority to be (A, H) and the secret key to be $T_A$;

executing a key generation algorithm, by:

computing a random identifier vector t for a user by applying a cryptographic hash function on a unique identifier;

computing a vector k such that k*A=(1, t)*H;

outputting vector k as a secret key for the user;

executing an encryption algorithm for the message m, by:

for each bit $m_i$ of message m:

generating a matrix x and a vector s and a matrix V whose first column is s;

generating an LWE sample $c_i$ with LWE matrix A and secret X;

generating an LWE sample $c_{i'}$ with LWE matrix H and secret X and adding M*V*B;

computing $m_{i'}$ as most significant bit of sky;

computing $(c_i, c_{i'})$ and $m_i$ XOR $m_{i'}$; and storing an encrypted message in a computerized storage medium, the encrypted message comprising, for each bit $m_i$, $(c_i, c_{i'})$ and $m_i^* = m_i$ XOR $m_{i'}$.

2. The method of claim 1, further comprising distributing the secret key over a communications network by only one authority.

3. The method of claim 1, wherein each user is identified by a set of attributes and a decryption ability for each encrypted message is based on a function of the attributes.

4. The method of claim 3, further comprising distributing the secret key k over a communications network by any polynomial number of independent authorities.

5. The method of claim 4, further comprising selecting, for each independent authority, a predetermined number and a set of attributes whereby the user can only decrypt the message m if the user has at least the predetermined number of attributes from each authority.

6. The computerized method of claim 1, further comprising decrypting the message according to the multi-authority attribute-based encryption scheme, the decrypting comprising:

reading the message from the computerized storage medium comprising bits representing $c_1 \ldots c_n$ and $c_{1'}, \ldots c_{n'}$ and $m_{1*}, \ldots m_{n*}$;

computing the random identifier vector t for the user by applying the cryptographic hash function on the unique identifier;

retrieving the secret key k from the computerized storage medium;
executing a decryption algorithm, wherein:
to decrypt the $i^{th}$ bit of the message:
computing a linear combination of $c_i*k+c_{i'}(1,t)$;
computing the most significant bit of the result XOR $m_{i*}$; and
storing the decrypted message in the computerized storage medium.

7. The method of claim 6, further comprising distributing the secret key k over a communications network by only one authority.

8. The method of claim 7, wherein each user is identified by a set of attributes and a decryption ability for each encrypted message is based on a function of the attributes.

9. The method of claim 8, further comprising distributing the secret key k over a communications network by any polynomial number of independent authorities.

10. The method of claim 9, further comprising selecting, for each independent authority, a predetermined number and a set of attributes whereby the user can only decrypt the message m if the user has at least the predetermined number of attributes from each authority.

11. A computerized system for encrypting a message according to a multi-authority attribute-based encryption scheme, the system comprising:
a computerized non-transitory storage medium configured for storing an electronic message m comprising $m_i$ bits for encryption;
a computerized processor configured for:
executing a global setup algorithm to generate global parameters by:
selecting LWE parameters and a noise distribution;
generating a matrix B with a first column of data y of random elements and the remainder set as all 0s except the diagonal which is set to be 1;
executing an authority setup algorithm to generate a public and secret key pair of an authority, by:
generating a first LWE matrix A;
generating a second LWE matrix H;
setting the public key of the authority to be (A, H) and the secret key to be $T_A$;
executing a key generation algorithm, by:
computing a random identifier vector t for a user by applying a cryptographic hash function on a unique identifier;
computing a vector k such that $k*A=(1, t)*H$;
outputting vector k as a secret key for the user;
executing an encryption algorithm for the message m, by:
for each bit $m_i$ of message m:
generating a matrix X and a vector s and a matrix V whose first column is s;
generating an LWE sample $c_i$ with LWE matrix A and secret X;
generating an LWE sample $c_i$ with LWE matrix H and secret X and adding $M*V*B$;
computing $m_{i'}$ as most significant bit of $s*y$;
computing $(c_i,c_{i'})$ and $m_i$ XOR $m_{i'}$; and
the computerized storage medium further configured for storing an encrypted message in a computerized storage medium, the encrypted message comprising, for each bit $m_i$, $(c_i,c_{i'})$ and $m_i*=m_i$ XOR $m_{i'}$.

12. The system of claim 11, wherein the computerized processor is further configured for distributing the secret key over a communications network by only one authority.

13. The system of claim 11, wherein each user is identified by a set of attributes and a decryption ability for each encrypted message is based on a function of those attributes.

14. The system of claim 13, wherein the computerized processor is further configured for distributing the secret key over a communications network by any polynomial number of independent authorities.

15. The system of claim 14, wherein the computerized processor is further configured for selecting, for each independent authority, a predetermined number and a set of attributes whereby the user can only decrypt the message m if the user has at least the predetermined number of attributes from each authority.

16. The computerized system of claim 11, further comprising:
the computerized storage medium further configured for storing the encrypted message comprising bits representing $c_1 \ldots c_n$ and $c_{1'}, \ldots c_{n'}$ and $m_{1*}, \ldots m_{n*}$, the message having been encrypted according to an attribute based encryption scheme;
the computerized processor further configured for:
computing the random identifier vector t for a user by applying the cryptographic hash function on the unique identifier;
retrieving the secret key k from the computerized storage medium;
executing a decryption algorithm, wherein:
to decrypt the $i^{th}$ bit of the encrypted message:
computing a linear combination of $c_i*k+c_{i'}(1,t)$;
computing the most significant bit of the result XOR $m_{i*}$; and
the computerized storage medium further configured for storing the decrypted message in the computerized storage medium.

17. The system of claim 16, wherein the computerized processor is further configured for distributing the secret key over a communications network by only one authority.

18. The system of claim 17, wherein each user is identified by a set of attributes and a decryption ability for each encrypted message is based on a function of the attributes.

19. The system of claim 18, wherein the computerized processor is further configured for distributing the secret key over a communications network by any polynomial number of independent authorities.

20. The system of claim 19, wherein the computerized processor is further configured for selecting, for each independent authority, a predetermined number and a set of attributes whereby the user can only decrypt the message m if the user has at least the predetermined number of attributes from each authority.

* * * * *